E. R. MILLER.
HARROW.
APPLICATION FILED MAR. 31, 1920.

1,366,819. Patented Jan. 25, 1921.

Inventor
Edward R. Miller.
By Chandler Chandler
Attorneys

UNITED STATES PATENT OFFICE.

EDWARD R. MILLER, OF RURAL RETREAT, VIRGINIA.

HARROW.

1,366,819.  Specification of Letters Patent.  Patented Jan. 25, 1921.

Application filed March 31, 1920. Serial No. 370,104.

*To all whom it may concern:*

Be it known that I, EDWARD R. MILLER, a citizen of the United States, residing at Rural Retreat, in the county of Wythe, State of Virginia, have invented certain new and useful Improvements in Harrows; and I do hereby declare the following to be a full, clear, and exact description of the invention, such as will enable others skilled in the art to which it appertains to make and use the same.

This invention relates to new and useful improvements in harrows and particularly to rollers and harrows.

One object of the invention is to provide a device of this character wherein a harrow element and land roller are combined in a novel form.

Another object is to provide a device of this character which is capable of being enlarged or reduced in length, and whereby the parts can be easily and quickly assembled or disassembled for purpose of adjustments and repairs.

Other objects and advantages will be apparent from the following description when taken in connection with the accompanying drawing.

Figure 1:
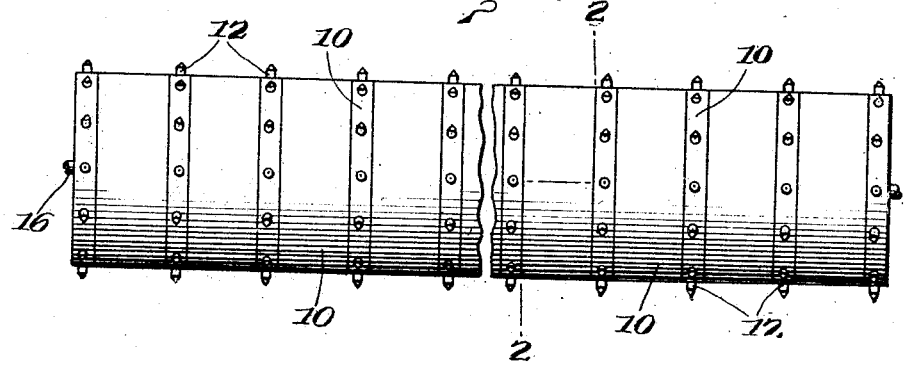
Figure 1 is an elevation of a harrow drum or roller made in accordance with the invention.
Figure 2:
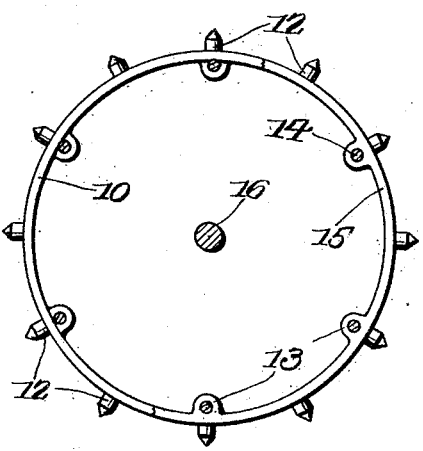
Fig. 2 is a vertical transverse sectional view taken on the line 2—2 of Fig. 1, between one of the rings and one of the bands or sleeves.
Figure 3:
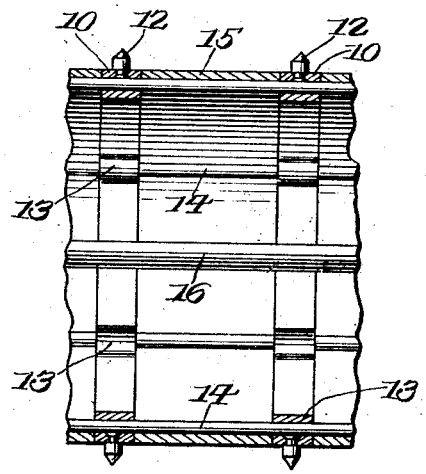
Fig. 3 is a fragmentary vertical longitudinal sectional view through the drum.

Referring particularly to the accompanying drawing, 10 represents a plurality of longitudinally alined and equally spaced rings, each of which has a plurality of radially extending teeth 12 secured thereto and projecting beyond the peripheral faces thereof. On the inner face of each of the rings 10 there are formed the circular series of inwardly extending and transversely apertured lugs 13, which receive the rods 14, which extend longitudinally of the drum. Between each pair of rings 10 there is disposed a band or sleeve 15, of a width greatly exceeding that of the rings, and of a thickness equal to that of the rings so that the external surfaces of the rings and bands will lie in the same curved plane. Extending longitudinally through the center of the drum is a shaft 16, on which the drum is mounted for rotation.

It will be noted that the bands 15 rest on the portions of the rods that lie between the rings 10, whereby said rings and bands are held in proper position on the drum, and the external surface of the drum rendered smooth and without projections except the teeth 12.

What is claimed is:

1. A skeleton drum for rotary harrows comprising heads and a series of longitudinal rods connecting them, a number of rings having apertured lugs strung on said rods and outwardly projecting teeth, and sleeves inclosing the rods between the rings for spacing the latter.

2. A skeleton drum for rotary harrows comprising heads and a series of longitudinal rods connecting them, a number of rings having apertured lugs strung on said bolts and teeth projecting tangentially therefrom all in one direction, and sleeves inclosing the rods between the rings for spacing the latter.

In testimony whereof, I affix my signature, in the presence of two witnesses.

EDWARD R. MILLER.

Witnesses:
W. O. GREENER,
W. F. ALLEN.